United States Patent
Mock

(10) Patent No.: US 8,863,132 B2
(45) Date of Patent: Oct. 14, 2014

(54) USING ABSTRACTION LAYERS TO FACILITATE COMMUNICATION BETWEEN SYSTEMS

(75) Inventor: Frank Mock, Diedorf (DE)

(73) Assignee: SAP SE, Walldorf (DE)

(*) Notice: Subject to any disclaimer, the term of this patent is extended or adjusted under 35 U.S.C. 154(b) by 1298 days.

(21) Appl. No.: 12/541,671

(22) Filed: Aug. 14, 2009

(65) Prior Publication Data

US 2010/0287570 A1     Nov. 11, 2010

Related U.S. Application Data

(60) Provisional application No. 61/176,651, filed on May 8, 2009.

(51) Int. Cl.
| | |
|---|---|
| G06F 9/44 | (2006.01) |
| G06F 9/45 | (2006.01) |
| G06F 9/46 | (2006.01) |
| G06Q 10/06 | (2012.01) |
| G06Q 30/06 | (2012.01) |
| G06F 9/54 | (2006.01) |
| G06F 9/48 | (2006.01) |

(52) U.S. Cl.
CPC ............... *G06F 9/541* (2013.01); *G06Q 10/06* (2013.01); *G06F 9/4843* (2013.01); *G06F 9/4428* (2013.01); *G06Q 30/0603* (2013.01)
USPC ........... 718/102; 717/116; 717/159; 719/328; 705/5; 705/7.12

(58) Field of Classification Search
CPC ..... G06F 9/4843; G06F 9/4433; G06F 9/443; G06F 9/4428
USPC .......................................................... 718/102
See application file for complete search history.

(56) References Cited

U.S. PATENT DOCUMENTS

| | | | | |
|---|---|---|---|---|
| 7,930,704 | B2* | 4/2011 | Mousseau et al. ............ | 719/328 |
| 2003/0053459 | A1* | 3/2003 | Brouk et al. .................. | 370/392 |
| 2004/0167894 | A1* | 8/2004 | Ziv .................................... | 707/9 |

(Continued)

FOREIGN PATENT DOCUMENTS

EP        0336552 A2       10/1989

OTHER PUBLICATIONS

Gavin et al., "A B2B Solution using WebSphere Business Integration V4.1 and WebSphere Business Connection V1.1", Aug. 11, 2003, Chapters 3-7.*

(Continued)

*Primary Examiner* — Lewis A Bullock, Jr.
*Assistant Examiner* — Kevin X Lu
(74) *Attorney, Agent, or Firm* — Kenyon & Kenyon LLP

(57) ABSTRACT

Systems and methods are provided for enabling communication between two systems using different commands, variables, protocols, methods, or instructions. In an embodiment, exit points in a software application may be used to insert additional code without altering the source code. In an embodiment, this additional code may interface with a backend abstraction layer, which may contain an itemization of functions to performed on external systems or data. In an embodiment, the abstraction layer may interface with a connectivity layer. In an embodiment, the connectivity layer may include instructions in a format recognized by the external system that correspond to the desired function in the backend abstraction layer that is to be executed at the external system.

12 Claims, 8 Drawing Sheets

(56) References Cited

U.S. PATENT DOCUMENTS

| | | |
|---|---|---|
| 2005/0021348 A1 | 1/2005 | Chan et al. |
| 2005/0188383 A1* | 8/2005 | Alcazar et al. ................ 719/331 |
| 2005/0198652 A1* | 9/2005 | Huscher et al. ............... 719/331 |
| 2007/0233754 A1 | 10/2007 | Baeuerle et al. |
| 2010/0287555 A1* | 11/2010 | Thormaehlen et al. ....... 718/102 |

OTHER PUBLICATIONS

European Search Report, European Application No. 10004489.0, dated Nov. 2, 2010.

* cited by examiner

USING ABSTRACTION LAYERS TO FACILITATE COMMUNICATION BETWEEN SYSTEMS

CROSS-REFERENCE TO RELATED APPLICATIONS

This application claims priority under 35 U.S.C. §119 to U.S. Provisional Patent Application No. 61/176,651, filed on May 8, 2009, and entitled "Integrating Backend Systems and Composite Applications," which is herein incorporated by reference in its entirety.

BACKGROUND

Many large businesses rely on enterprise resource planning computing architectures and systems to electronically manage and coordinate business resources, information, and functions. In large organizations these computing architectures may be made up of hundreds of systems, distributed across various entities making up the organization. For example, a global business may rely on location-specific logistics systems to process orders in different localities, division specific supply chain management systems to manage supply chains across geographies, and business specific accounting systems to manage financial transactions at a business level.

These systems may interact not only with other systems in the organization, but also with external systems managed by other organizations. In many instances these enterprise resource planning systems may be preconfigured to communicate with other systems using similar commands, variables, and methods. However, over time different systems in the organization may be replaced or upgraded, or new systems may be introduced into the organization that do not communicate using the same commands, variables, or methods. Integrating systems that do not communicate using the same commands, variables, or methods into existing systems was time consuming and cumbersome. In many instances, software programs and source code would have to be reconfigured to enable communication between these systems. Reconfiguring these systems is not only costly and inefficient, but is also time consuming and prevents quick integration of critical replacement systems into enterprise resource planning systems.

Thus, there is a need to quickly and inexpensively integrate systems using different communication commands, variables, and methods into existing systems.

DETAILED DESCRIPTION

In an embodiment, an enterprise resource planning system contains multiple modules or layers enabling specific functionality. Each of these layers may contain a group of reusable components that may be reused by the system to perform similar functions in different instances. For example, an embodiment may contain a portal layer, which may set the environment in which the system is being used; a process logic layer, which may direct the flow of information in the system; a user interface layer, which may control the data displayed to a user; a business logic layer, which may control data interactivity such as data retrieval, alteration, and storage; an abstraction layer, which may contain an itemization of functions performed on external data; and a connectivity layer, which may contain commands, variables, or methods in a format recognized by an external system.

In an embodiment, the commands, variables, or methods in the connectivity layer may be associated with corresponding functions in the abstraction layer. In this embodiment, when enterprise resource planning system executes a function to be performed on data in the external system, the function may be identified in the abstraction layer, and the corresponding commands, variables, or methods in the format recognized by the external system may be retrieved through the connectivity layer and sent to the external system. No reconfiguration of source code is required in this instance because instructions are sent to the external system in its native format through the abstraction and connectivity layers.

Figure 1:
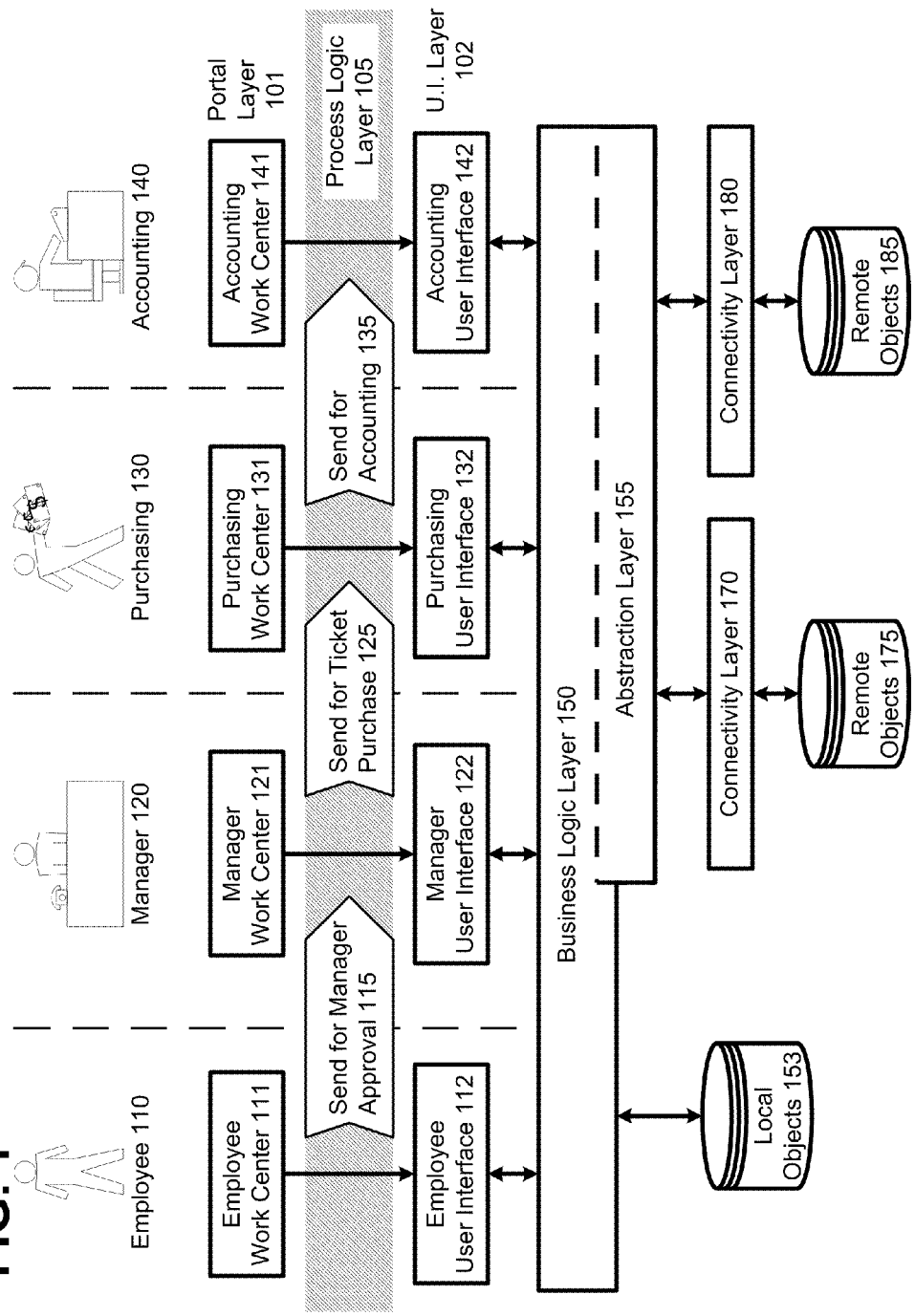
FIG. 1 shows exemplary functions of each layer in an embodiment of an enterprise resource planning system.

FIG. 1 shows exemplary functions of each layer in an embodiment of an enterprise resource planning system. In the FIG. 1 example, an employee 110 may be using the enterprise resource planning system to perform a business activity, such as purchasing an airline ticket for business travel. To begin the purchasing process, the employee 110 may initially connect to the enterprise resource planning system through a portal session. The portal session may be managed by the portal layer, which may contain components identifying the role of a user and a context of the user connecting to the system.

The role of the user may be stored as part of a user profile together with user login information so that when the user logs in to either the enterprise resource planning system or a second system sharing user profile information with the enterprise resource planning system, the portal layer 101 can access the user role information. In another embodiment, user role information may be transmitted to the portal layer 101 as part of a request to initiate a portal session with the enterprise resource planning system.

The user context may vary depending on the functionality being requested of the enterprise resource planning system. For example, in FIG. 1 the employee 110 may be attempting to purchase an airline ticket. In another situation, a user may want to process a financial transaction, generate a report, or perform other business functions. The portal layer 101 may determine the user context based on the application initiating the portal session. In an embodiment the user context may be determined from information included as part of a request to initiate a portal session with the enterprise resource planning system.

Once the portal layer 101 identifies a use context and/or user role, data may be sent to the user interface layer 102 specifying the environment that is to be provided to the user.

In the case of employee 110 attempting to purchase an airline ticket, the portal layer 101 may receive information from the employee's 110 user profile that the role of the employee 110 is an employee and may receive use context information in the portal session request that the airline ticket purchase function is to be performed. From this information, the portal layer 101 may determine, through a lookup table or other means, that the employee work center environment 111 is the proper environment and send this information to the user interface layer 102.

The user interface layer 102 may then begin generating a user interface screen 112 for the employee 110 to enter or select desired flight information. In generating the user interface screen 112, the user interface layer 102 may need to access, retrieve, or store data, such as the employees name, title, department, destination, date, and class of service. Some of this information may be stored locally in local object 153 whereas some information may be stored remotely on external systems in remote objects 175 and 185.

The business logic layer 150 may contain components identifying which objects are stored locally 153 and remotely 175 and 185. The business logic layer 150 may also contain components for retrieving, changing, or storing local objects 153 and may interface with an abstraction layer 155 to retrieve, change, or store remote objects 175 and 185. Thus, if data relating to the employee 110, such as name, title, department, and manager are stored locally, the business logic layer 150 may retrieve that data from local objects 153 and insert it in employee user interface 112.

The abstraction layer 155 may contain an itemization of functions performed by the enterprise resource planning system on external data. Thus, if the enterprise resource planning system obtains or stores flight information, such as flight number, departure time, and cost in remote objects 175 and 185 on external systems, the abstraction layer 155 may include an itemization of each of these functions for each data object. Thus the abstraction layer 155 may include different entries for reading, changing, and storing each piece of flight information.

Each itemized entry in the abstraction layer 155 may have a corresponding entry the connectivity layer 170 or 180. For example, if certain information, such as flight number and departure time are stored in one set of remote objects 175 and other information, such as cost, is stored in another set of remote objects 185, then the entries in the abstraction layer 155 corresponding to the first set of information (flight number and departure time) would have corresponding entries in connectivity layer 170, while the second set (cost) would have corresponding entries in connectivity layer 180.

In an embodiment, the connectivity layer 170 may contain instructions in a format recognized by the remote object system 175 for performing the functions itemized in the abstraction layer 155 relating to objects 175. Similarly, connectivity layer 180 may contain instructions in a format recognized by the remote object system 185 for performing the functions itemized in the abstraction layer 155 relating to objects 185.

Once all the requisite data from objects 153, 175, and 185 has been entered, viewed, changed, or stored through the employee user interface 112, and the employee 110 is done entering the required information, the process logic layer 105 then uses components to determine the next step in completing the process. The next step may be determined through a stored workflow, which may route the process to a specific entity or function depending on the workflow criteria associated with the process. In the FIG. 1 embodiment, the stored workflow for the employee's 110 air travel request may indicate that once the air travel information is submitted by the user, it sent to the manager for approval 115. The process logic layer 105 may then transmit the air travel request submitted by employee 110 to the manager 120 of the employee 110 according to the approval workflow 115.

Once the manager 120 receives the air travel request, the manager 120 may initiate a portal session though portal layer 101. In this case, the portal layer 101 may send a request to the user interface layer 102 to initiate a manager work center environment 121 based on the role of the manager 120 as a manager and the context of approving the employee's 110 air travel request. In this case, the user interface layer 102 may generate a manager user interface screen 122, where the manager 120 can approve, not approve, or change the employee's 110 air travel request. The business logic layer 150 may then directly retrieve, modify, and store data as needed from the local objects 153, and may indirectly retrieve, modify, and store data as needed from remote objects 175 and 185 through the abstraction layer 155 and connectivity layers 170 and 180.

Once the manager 120 has approved the air travel request, the process logic layer 105 may send the approval to purchasing 130 for ticket purchase 125 according to the workflow 125 associated with the process. In an embodiment, a workflow may include multiple outcomes for different situations, so the process logical layer 105 could have sent the air travel request back to the employee 110 if the manager 120 had denied the request.

This functionality may also be repeated for the purchase 130 and accounting 140 processes in an embodiment—once a purchaser in purchasing 130 receives the approval, the purchaser 130 may initiate a portal session though portal layer 101. In this case, the portal layer 101 may send a request to the user interface layer 102 to initiate a purchasing work center environment 131 based on the role of the purchaser 130 and the context of purchasing the approved airline ticket. In this case, the user interface layer 102 may generate a purchasing user interface screen 132, where the purchaser 130 can buy the airline ticket for the employee 110. The business logic layer 150 may then directly retrieve, modify, and store data as needed from the local objects 153, and may indirectly retrieve, modify, and store data as needed from remote objects 175 and 185 through the abstraction layer 155 and connectivity layers 170 and 180.

Once the purchaser 130 has bought the tickets, the process logic layer 105 may send the purchase information to accounting 140 according to the workflow 135 associated with the process. Similarly, once accounting 140 receives the purchase information, the accountant 140 may initiate a portal session though portal layer 101. In this case, the portal layer 101 may send a request to the user interface layer 102 to initiate a accounting work center environment 141 based on the role of the accountant 140 and the context of accounting for the purchased airline ticket. In this case, the user interface layer 102 may generate a accounting user interface screen 132, where the accountant 140 can enter accounting related information. The business logic layer 150 may then directly retrieve, modify, and store data as needed from the local objects 153, and may indirectly retrieve, modify, and store data as needed from remote objects 175 and 185 through the abstraction layer 155 and connectivity layers 170 and 180.

Figure 1A:
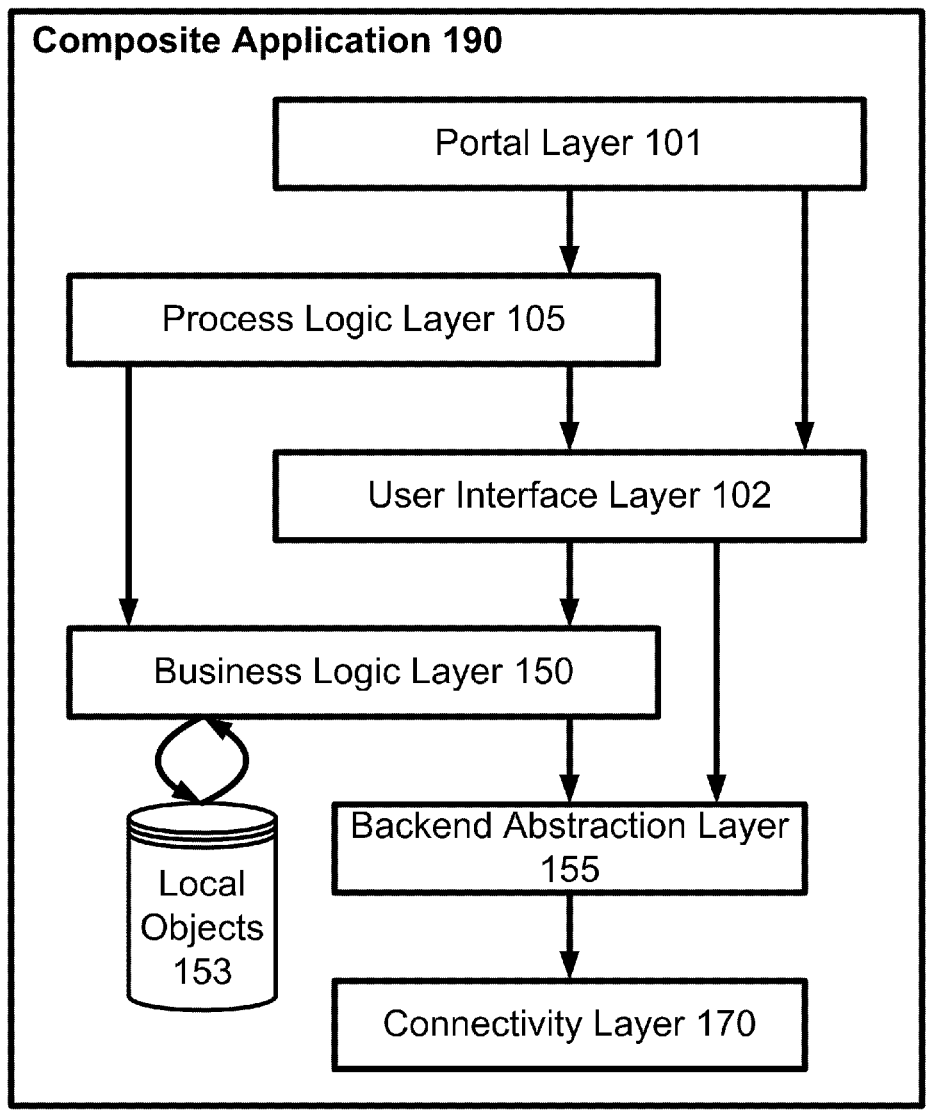
FIG. 1A shows exemplary interactivity between layers in an embodiment.

FIG. 1A shows exemplary interactivity between layers in an embodiment of a composite application 190. In an embodiment, when a user such as employee 110 or manager 120 first interacts with an embodiment, such as a composite application 190, the portal layer 101 may identify a use context and/or user role of the user. A list of workflow items requiring action by the user may then be retrieved through the process logic layer 105. For example, if the user is a manager 120, the process logic layer 105 may review and generate a list of items previously sent for manager approval 115 which the manager has not acted on. In an embodiment, the list of items awaiting action may be compiled by the process logic layer 105 using data obtained through the business logic layer 150 and displayed to the user through the user interface layer 102. In an embodiment, this data may be displayed to the user through an email, alert, to-do list, or other form of user notification.

Once a user, such as manager 120 or employee 110, selects a task or function, such as reviewing an air travel request sent for manager approval 115 or initiating a request for air travel, the selected function or task may send through the portal layer 101 to the user interface layer 102 where the appropriate user interface screen may be generated, such as a screen for reviewing or initiating the air travel request. Data may be sent from the user interface layer 102 to the business logic layer 150, where data may be retrieved from local objects 153 or a process agent may be created to direct communication through the backend abstraction layer 155 when the data is not stored in local object 153. In an embodiment, the process agent may be used at the user interface layer 102 for further related communication through the backend abstraction layer 155. In an embodiment, once a method has been identified in the backend abstraction layer 155, the operation in the connectivity layer 170 corresponding to the identified method may be used to perform the desired method on data in an external system, such as retrieving data from the external system.

In an embodiment, once a user has completed a task or function, such approving the air travel request sent for manager approval 115 or completing the request for air travel, the task completion may be sent from the portal layer 101 to the process logic layer 105. Further workflow instructions may retrieved through the business logic layer 150. The business logic layer 150 may obtain these workflow instructions from local objects 153 or from remote objects through the backend abstraction layer 155 and connectivity layer 170 through a process agent. Once further workflow instructions have been retrieved, the process logic layer 105 may redirect the completed task or function according to the workflow instructions. For example, an approval air travel request may be sent for ticket purchase 125 while a completed air travel request may be sent for manager approval 115.

Figure 2:
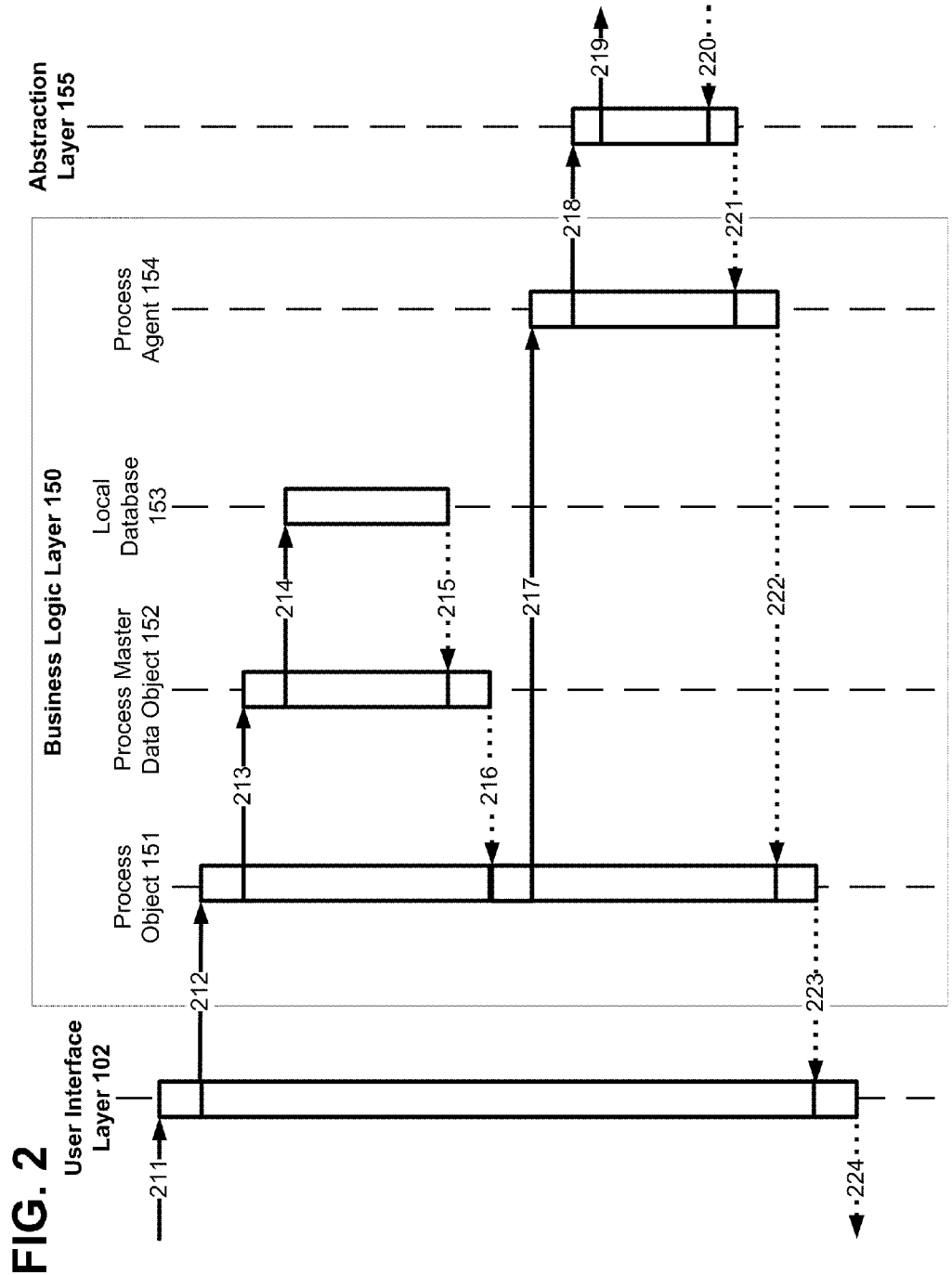
FIG. 2 shows a configuration of the business logic layer in an embodiment.

FIG. 2 shows a configuration of the business logic layer 150 in an embodiment. In step 211, data is received at the user interface layer 102 that begins the process of generating a user interface screen. In an embodiment, the data that is received at the user interface layer 102 may be received from the portal layer 101. During either the initial processing of the user interface screen, or subsequent processing of the user interface screen after the initial screen has been generated, additional data in data objects 153, 175, and/or 185 may need to be accessed, changed, or stored.

In step 212, the requested interactivity with data objects 153, 175, and/or 185 is sent to a selected process object 151 in the business logic layer 150. The selected process object 151 may be dependent on the needs of the user interface layer 102, and different process objects 151 may be coupled to different user interface layer 102 functionalities. Each process object 151 may control the execution of a process step, store the current state of the process step, and/or compose process master data objects 152 and process agents 154 to complete the process step. A process step may involve reading, writing, changing, or otherwise accessing data.

At step 213, process object 151 may initiate or access an instance of a process master data object 152 to access or hold process related transient and/or persistent master data. This transient and/or persistent master data may be stored in a local database 153, which may be accessed by process master data object 152, as shown in step 214, where data is sent to local database 153, and step 215, where data is retrieved from local database 153. Data retrieved from local database 152 in step 215 may be sent to the process object 151 by the process master data object 152 in step 216.

At step 217, process object 151 may initiate or access a process agent instance 154 to transfer information between external systems. In an embodiment, all communication with the backend abstraction layer 155 must be done by process agents 154, and all communication with external systems must occur through the backend abstraction layer 155. In other embodiments, some non-backend abstraction layer communications with external system are permitted. In an embodiment, a process agent 154 may only be either an outbound process agent or an inbound process agent. In an embodiment, an outbound process agent may be used to call methods in the backend abstraction layer that lead to outbound enterprise service calls, while an inbound process agent may be used to compute a call from the backend abstraction layer to the business logic layer.

In an embodiment, an outbound process agent may be able to perform read or write services. In an embodiment, data may be read from an external system only through the backend abstraction layer through read process agents. A read process agent may call read or find methods in the backend abstraction layer, while a write process agent may call change, update or action methods in the backend abstraction layer at a save event.

Once an outbound process agent is sent to the backend abstraction layer 155 in step 218, in step 219 the abstraction layer 155 sends a request to the connectivity layer 170 or 180 to send the appropriate instructions to the external system to perform the desired operation. Once a result from performing the desired operation has been received by the abstraction layer in step 220, an inbound process agent containing the result is sent to process agent 154 in step 221. In step 222, the result may be sent to process object 151. In step 223, the result may be sent to the user interface layer 102, and in step 224, the result may be presented to the user through the user interface screen.

Figure 3:
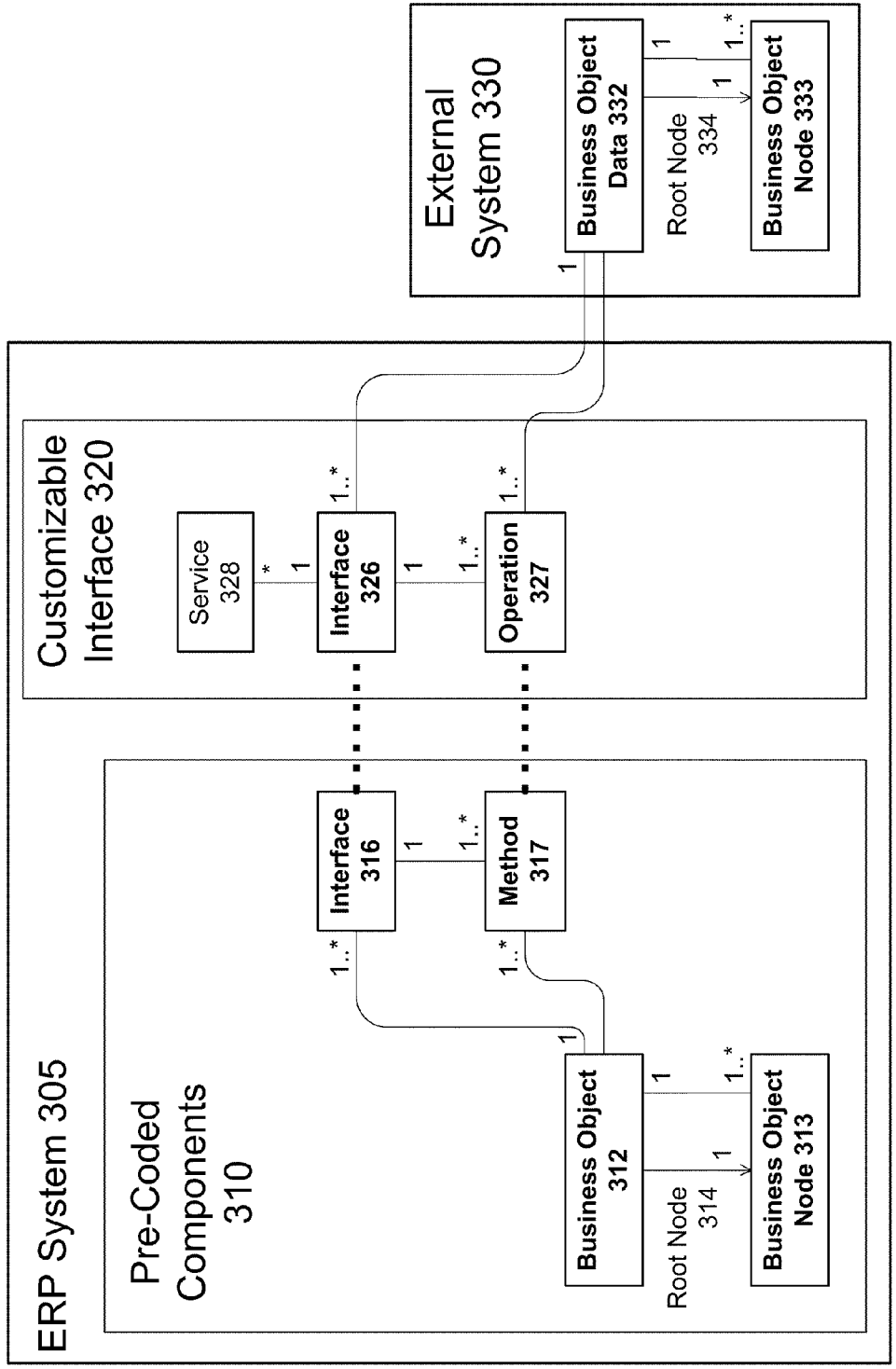
FIG. 3 shows how the business logic layer, backend abstraction layer, and connectivity layers may be configured in an exemplary enterprise resource planning system to enable communications with external systems.

FIG. 3 shows how the business logic layer 150, backend abstraction layer 155, and connectivity layers 170 and 180 may be configured in an exemplary enterprise resource planning system 305 to enable communications with external systems 330 using different communications commands, variables, and/or methods. In an embodiment, enterprise resource planning system 305 may contain several business objects 312. Each business object 312 may represent an entity in the business domain supported by the system, such as sales orders, line items, ledger entries, or invoices. In an embodiment, each identified business object 315 may be represented by one or more business add-ins (BAdIs). A BAdI can be used to define exit points in an application where users may attach additional code to standard source code without having to modify the an original object or source code.

In an embodiment, each BAdI representing an identified business object 312 may contain one or more services or methods 317 that an application in the enterprise resource planning system 305 may perform on the business object data 332 or node of the business object data 333 in the external system 330. In an embodiment, these services or methods 317 may be pre-coded 310 in the enterprise resource planning system 305. In an embodiment, an entity may enter corresponding instructions in a format recognized by the external system 330 through a customizable interface 320 to perform the specific operations 327 on the business object data 332 or nodes 333 in the external system 330.

The pre-coded interfaces 316 and methods 317 in the BAdI may be associated with the corresponding instructions in interfaces 326, operations 327, and services 328 so that when the BAdI is called in the enterprise resource planning system 305, the corresponding instructions are sent to the external system 330 to execute the desired actions at the external system 330. Thus, whenever the external system 330 is upgrade, modified, or changed, an organization need only change the corresponding instructions in the customizable interface 320 on the enterprise resource planning system 305 to ensure ongoing communications between the two systems.

FIG. 3 shows a conceptual mapping between the manufacturer coded components 310 and the customizable components 320 in an enterprise resource planning system 305 to illustrate how data is retrieved from an external system 130. An application running on the enterprise resource planning system 305 may run different processes on one or more business objects 312. To run these different processes on the business objects 312 in the enterprise resource planning system 305, the application may require associated data 332 or 333 stored in an external system 330.

In an embodiment, each system 305 and 330 may maintain a plurality of business objects 312 and 332. Business objects 312 and 332 may differ from each other. In some embodiments, business objects 312 may contain similar data to business objects 332, but in other embodiments business objects 312 may contain subsets of data in business objects 332. In an embodiment, business objects 312 may contain transformations of data in business objects 332. In an embodiment, business objects 312 may not contain any of the data found in business objects 332.

Each business object 312 and 332 may include a root object node 314 and 334 respectively, and a plurality of other object nodes 313 and 333 based on the respective root node. Each of the nodes may contain specific formatting instructions for the corresponding business object 312 and 332 that may vary depending on the processes and circumstances under which the business object is used. Each of the nodes may include a means for associating the formatting instructions with a specific process or circumstance, including links, identifiers, or keys.

Each business object 312 may also have a plurality of interfaces 316 associated with the business object. Each interface 316 may include a rule for identifying the conditions on which the interface is to used. These rules may include comparing data in the business object to specified criteria, such as the processes the application is trying to execute. For example, an interface may contain a rule that the interface is to be applied when an application executes a process to create a sales order form using data from a sales order business object.

Figure 5:
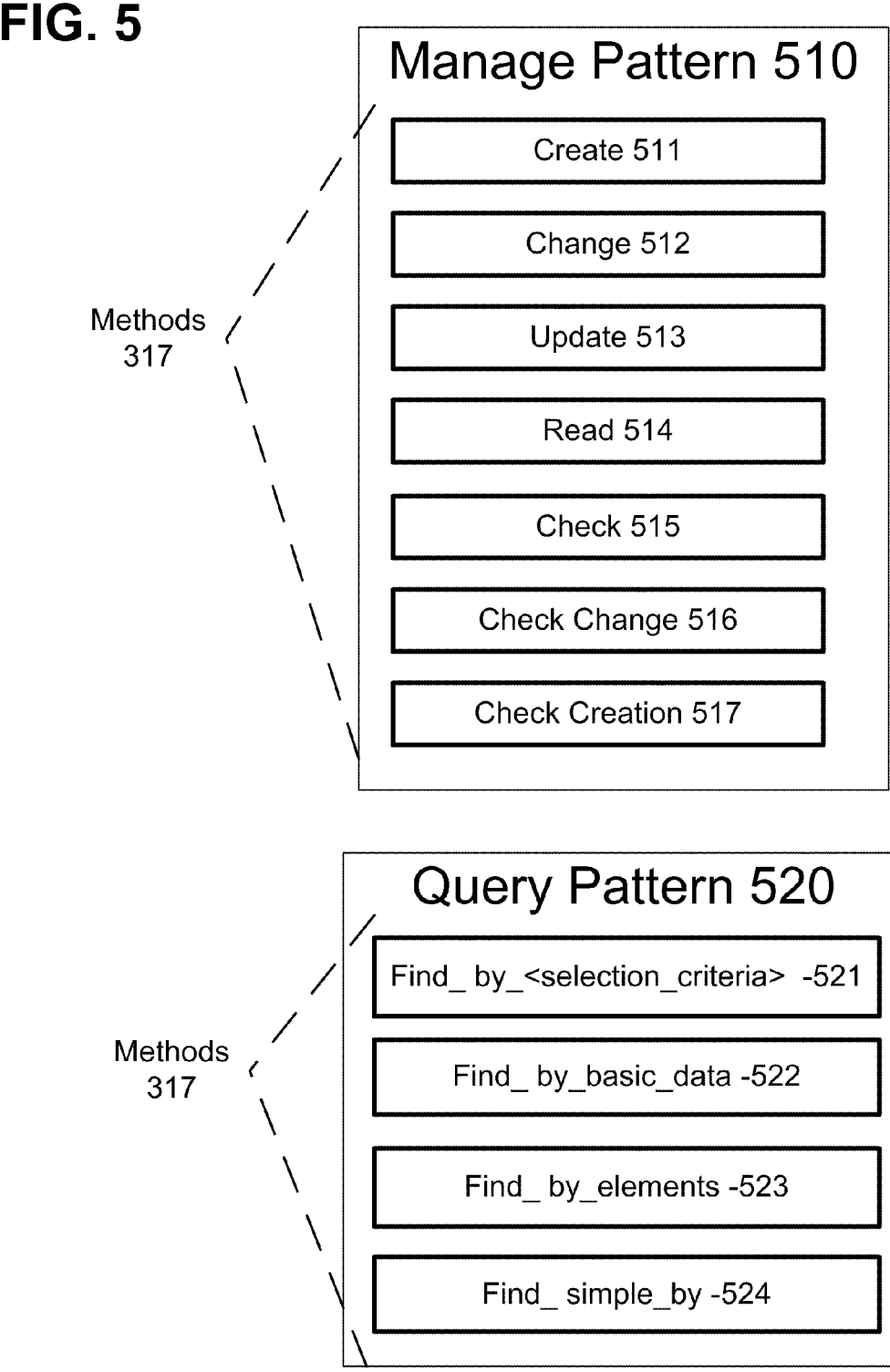
FIG. 5 shows a list of exemplary methods associated with patterns in an embodiment.

Each interface 316 may contain a plurality of methods 317, so that when the rule in the interface 316 is satisfied, the methods 317 in the interface 316 may be used to identify the specifics functions that are to be performed at the second system 330 on the corresponding business object data 332. Examples of methods 317 including querying business object data 332 to retrieve specific data, changing business object data 332, and/or deactivating unused business object data 332. FIG. 5 shows examples of different methods 317 that may be used in various embodiments.

In some embodiments, business objects 312, business object nodes 313, interfaces 316, and methods 317, may be supplied by the software developer as pre-coded components 310 of the application on the enterprise resource planning system 305. The application may also contain a customizable interface 320. The customizable interface 320 may include an interface 326 linked to or associated with each pre-coded interface 316. Each interface 326 may contain a plurality of enterprise services 328 and service operations 327.

In an embodiment, the components in the customizable interface 320 including the interface 326, enterprise services 328, and service operations 327, may be configured or customized by an organization using the application on the enterprise resource planning system 305. Customization may be necessary in some embodiments, when the organization acquires a external system 330, that uses different communications protocols, data structures, or software than the enterprise resource planning system 305.

In these instances, the organization may modify the components of the customizable interface 320 to include communications protocols, commands, and instructions recognized by the second system 330, in order for the application on the enterprise resource planning system 305 to interact with the business object data 332 on the external system 330. This interactivity may be enabled by including specific instructions recognized by the external system 330 in the service operations 327 of the interface 326 corresponding to the pre-coded method 317 of the pre-coded interface 316.

Thus, when the application executes a method 317 associated with an interface 316 of a business object 312, the instructions programmed by the organization into the corresponding operation 327 field of the corresponding interface 326 are sent to the external system 330 to perform the desired function on the corresponding business object data 332 at the external system 330.

Figure 4:
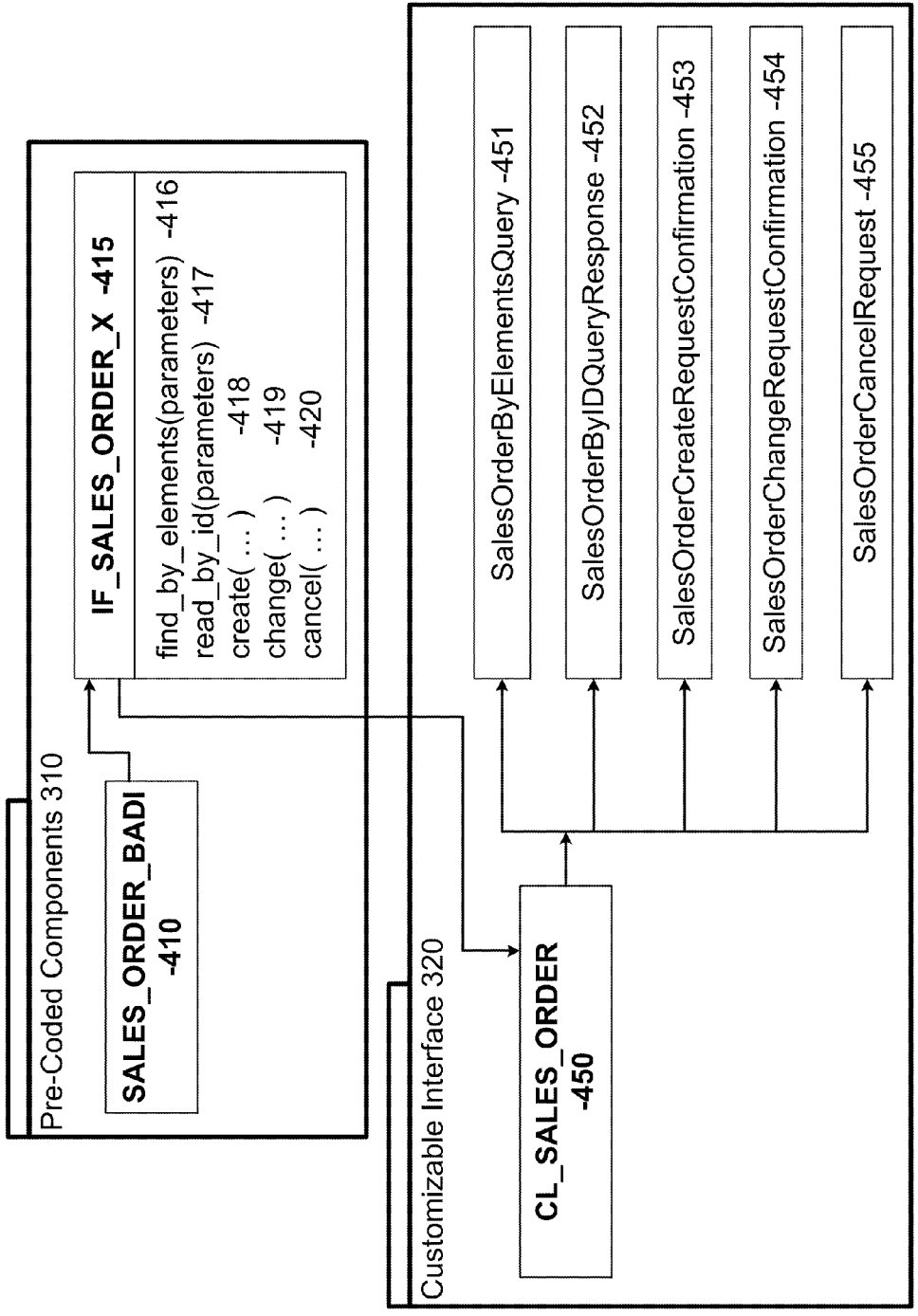
FIG. 4 shows an exemplary embodiment in an application containing a SALES_ORDER business object.

FIG. 4 shows an exemplary embodiment in an application containing a SALES_ORDER business object 312. In this embodiment, a third party or software developer inserted certain pre-coded components 310 into the application based on the business objects 312 in the application and the functionality included in the application as it relates to the business objects 312. In this case, a BAdI designated as SALES_ORDER_BADI 410 has been pre-coded and added to the software application to correspond to the SALES_ORDER business object 312. The BAdI corresponding to a business object 312 may contain, link to, or be associated with a plurality of interfaces 316. In this case, the interface IF_SALES_ORDER_X 415 is shown. The IF_SALES_ORDER_X interface 415 may contain a rule or criteria for determining whether the interface is the proper interface for a specific function in the application involving the SALES_ORDER business object 312. In an embodiment, the rule or criteria may be verified through a logical IF test involving the business object 312 and/or one or processes being executed by the applications. Thus, the IF_SALES_ORDER_X interface 415 may apply if a process in the application relating to the SALES_ORDER business object satisfies criteria X.

Once the rules and/or criteria associated with an interface are satisfied, specific methods 317 associated with the interface may also be inserted by a third party or software developer. In the embodiment shown in FIG. 4, these methods 317 may include find_by_elements 416, read_by_id 417, create 418, change 419, and cancel 420. Each of these methods may include one or more parameters of the business object 312 that may relate to the specific function being performed. For example, the parameters of the read_by_id method 417 may include an identifier of the business object data that is to be read. Similarly, the parameters of the create method 416 may include all of the information relating to a business object or business object instance that is to be created. Examples of additional methods 317 are shown in FIG. 5.

In some embodiments, organizations may store data, such as business object data 332 relating to the SALES_ORDER business object 312, on an external system 330. For example, the organization may store customer information, sales order numbers, delivery date information, product information, and other information that the application on the enterprise resource planning system 305 may use to generate a sales form through the SALES_ORDER business object 312. Commands, protocols, and/or instructions used by the external system 330 that are not programmed into or recognized by the application on the enterprise resource planning system 305, may be entered by into the customizable interface 320.

As discussed previously, the customizable interface 320 may contain a plurality of interfaces 326, each interface 326 being associated with a corresponding pre-coded interface 316. In the embodiment of FIG. 4, the customizable interface 320 may have a CL_SALES_ORDER interface 450 corresponding to the IF_SALES_ORDER_X interface 415. The CL_SALES_ORDER interface 450 may contain, link to, or be associated with a plurality of operations 327 corresponding to the methods 317 associated with the interface 316.

In the embodiment of FIG. 4, the SalesOrderByElementsQuery operation 451 may correspond to the find_by_elements method 416, the SalesOrderByIDQueryResponse operation 452 may correspond to the read_by_id method 417, the SalesOrderCreateRequestConfirmation operation 453 may correspond to the create method 418, the SalesOrderChangeRequestConfirmation operation 454 may correspond to the change method 419, and the SalesOrderCancelRequest operation 455 may correspond to the cancel method 420. Each of these operations 451 to 455 may contain instructions, commands, and/or protocols recognized by the second system that perform the desired methods 416 to 420 on the business object data 332, when they are processed at the external system 330.

In addition to each interface 316 containing a plurality of methods 317, the plurality of methods 317 may be categorized in some embodiments in groups known as patterns. FIG. 5 shows a list of exemplary methods 317 associated with a manage pattern 510 and a query pattern 520 in an embodiment. Patterns 510 and 520 may be a means for grouping methods 317 relating to the management and/or organization of business object data 332.

In an embodiment, the create method 511 may use business object information as an input in order to create a business object instance including the inputted business object data 332. The change method 512 may use business object information as an input in order to change business object data 332 in a business object instance, without checking whether the business object instance was changed since the last "read." The update method 513 may use business object information as an input order to update data 332 in a business object instance, after checking whether the instance was changed since the last "read." The read method 514 may use one or more business objects identifiers as an input to retrieve business object instance data 332. The check method 515 may use business object information as an input to check the data consistency of the business object data 332, while the check change 516 and check creation 517 methods may be used to verify the consistency of changes to business object data 332 or new business object data 332.

FIG. 5 also shows exemplary methods 317 associated with a query pattern 520 in an embodiment. The find_by_<selection_criteria> method 521 may return business object data 332 for those objects satisfying the selection criteria submitted with the invocation of the method. The find_by_basic_data method 522 may return business object data 332 for those objects having header data satisfying the basic data selection criteria submitted with the invocation of the method. The find_by_elements method 523 may return business object data 332 related to a specified business object 312 when a query expression has a large amount of different selection criteria that cannot be named semantically. The find_by_elements method 523 may allow a complex query to be broken into simpler queries that otherwise may not be named semantically. The find_by_basic_data method 524 may return information identifying a business object data 332 satisfying selection criteria submitted with the invocation of the method.

Each of the methods 317 shown in FIG. 5 may be included in one or more interfaces 316 depending on the processes being executed on the business object 312 by the application on the enterprise resource planning system 305. Each of the methods 317 included in an interface 316 may be associated with a corresponding operation 327 in the customizable interface 320.

Figure 6:
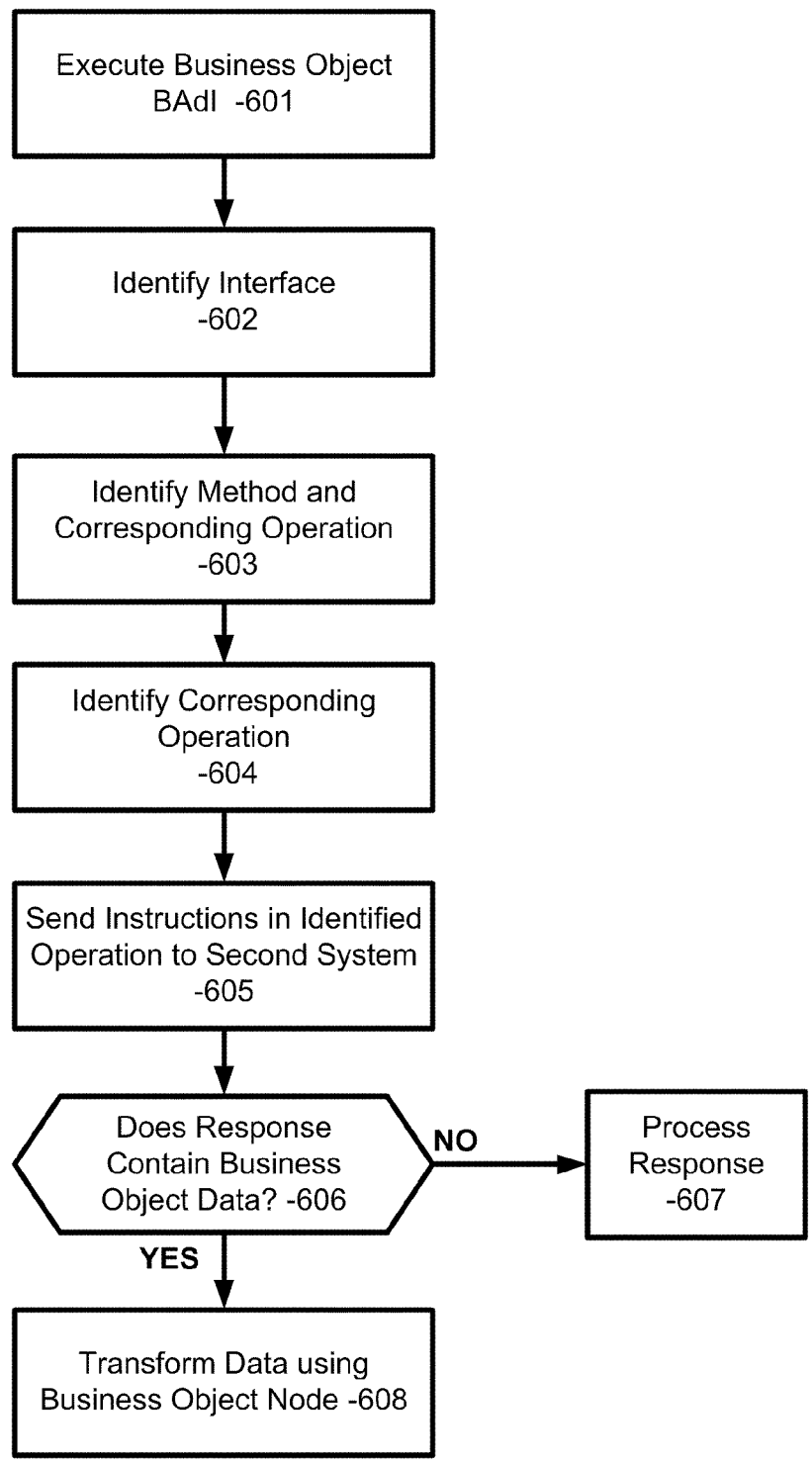
FIG. 6 shows process steps for using business object data in the external system in an embodiment.

FIG. 6 shows process steps for using business object data 332 in the external system 330 in an embodiment where the customizable interface 320 has been adapted to enable communication with the external system 330. In an embodiment, an application on the enterprise resource planning system 305 may contain an instruction to perform a function on a business object 312 using business object data 332 stored on the external system 330.

In an embodiment, when the instruction is executed at a processor, a Business Object Add-In (BAdI) 410 may be executed in step 601. In step 602, after executing the BAdI 410 associated with the business object 312, a processor may check the rules and/or criteria of each interface 415 associated with the BAdI 410 to identify an interface(s) 415 having its rules and/or criteria satisfied. In step 603, a processor may then identify a method(s) 416, 417, 418, 419, and/or 420 associated with the desired function to be performed in the application. Once the appropriate method(s) 416, 417, 418, 419, and/or 420 have been identified, the corresponding operations 451, 452, 453, 454, and/or 455 in the corresponding interface 450 may be identified in step 604.

Thus, if the create method 418 was identified when executing SALES_ORDER_BADI 410 in IF_SALES_ORDER_X interface 415, the SalesOrderCreateRequestConfirmation operation 453 in interface CL_SALES_ORDER 450 may be identified as associated with the create method 418 in step 604 through a link or other connection. Once the operations 451, 452, 453, 454, and/or 455 have been identified, in step 605 the specific instructions, commands, and/or protocols associated with the operation 451, 452, 453, 454, and/or 455 for performing the desired function at the external system 330 may be sent to the external system 330.

Upon receiving a response from the external system 330 to the specific instructions, commands, and/or protocols sent by the enterprise resource planning system 305, in step 606 a processor may check whether the response contains business object data 332 or other data, such as confirmation data that an event has or has not occurred at the external system 330.

When the response does not contain business object data 332, in step 607 the response may be continue to be processed based on the data in the response. However, when the response contains business object data 332, in step 608, the business object data 332 may be transformed, reformatted, or otherwise manipulated according to instructions in the business object node 313 corresponding to the function to be performed in the application.

In some embodiments, the instructions in operations 451, 452, 453, 454, and/or 455 may include instructions for retrieving data from a specific business object node 333 in the external system 330. In this case, the business object node data 333 retrieved from the external system 330 may be used to transform, reformat, or otherwise manipulate business object data 312 or 332 according to instructions specified in the retrieved business object node 333.

Figure 7:
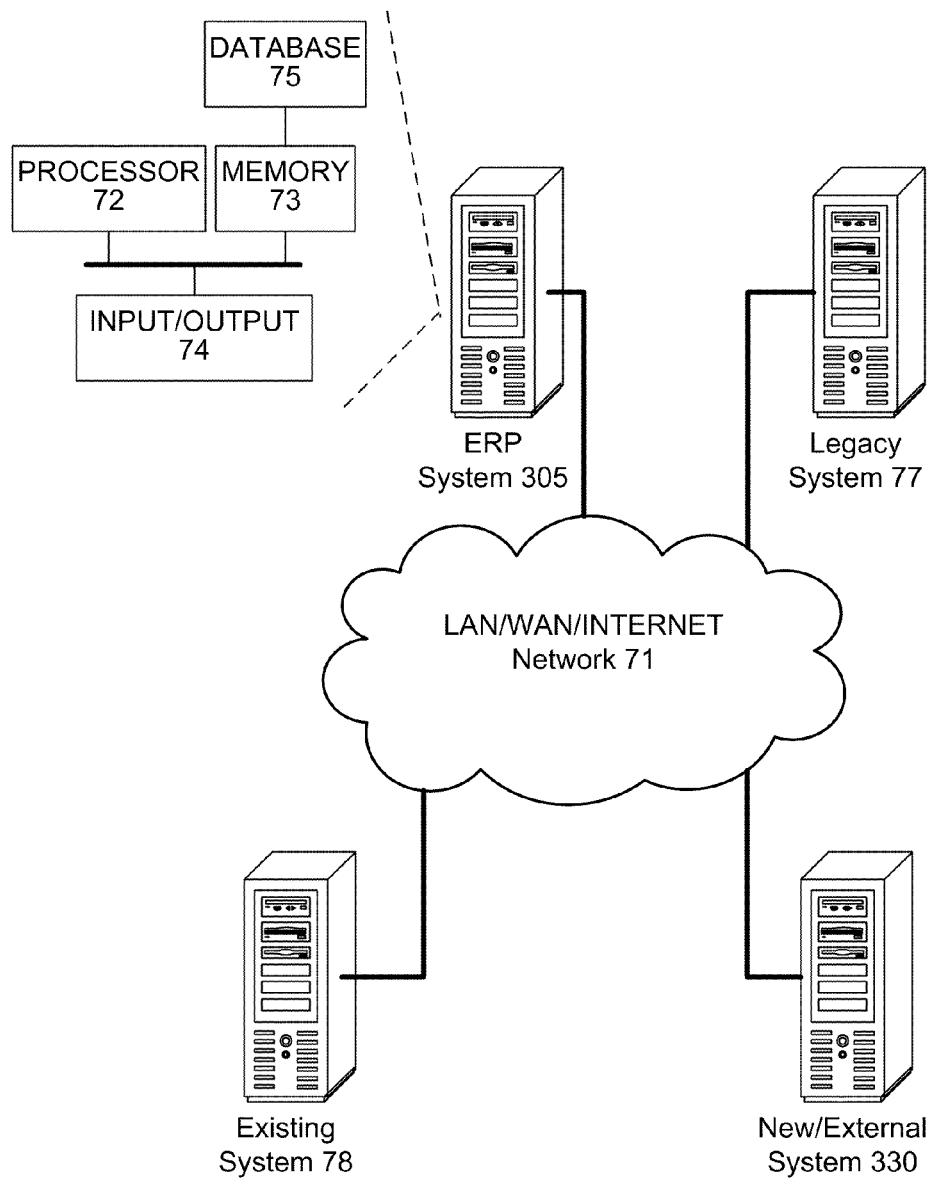
FIG. 7 shows an embodiment of an enterprise resource planning system connected to other systems.

FIG. 7 shows an embodiment of an enterprise resource planning system. In this embodiment, enterprise resource planning system 305, legacy system 77, external system 330, and existing system 78 are all interconnected through network 71. Each of the systems in FIG. 7 may contain a processor 72, memory 73 containing a database 75, and an input/output interface 74, all of which are interconnected via a system bus. In various embodiments, each of the systems 305, 330, 77, and 78 may have an architecture with modular hardware and/or software systems that include additional and/or different systems communicating through one or more networks. The modular design may enable a business to add, exchange, and upgrade systems, including using systems from different vendors in some embodiments. Because of the highly customized nature of enterprise resource planning systems 305, different embodiments may have different types, quantities, and configurations of systems depending on the environment and organizational demands.

In an embodiment, memory 73 may contain different components for retrieving, presenting, changing, and saving data. Memory 73 may include a variety of memory devices, for example, Dynamic Random Access Memory (DRAM), Static RAM (SRAM), flash memory, cache memory, and other memory devices. Additionally, for example, memory 73 and processor(s) 72 may be distributed across several different computers that collectively comprise a system.

Processor 72 may perform computation and control functions of a system and comprises a suitable central processing unit (CPU). Processor 72 may comprise a single integrated circuit, such as a microprocessor, or may comprise any suitable number of integrated circuit devices and/or circuit boards working in cooperation to accomplish the functions of a processor. Processor 72 may execute computer programs, such as object-oriented computer programs, within memory 73.

Note that while embodiments of the present invention are described in the context of a fully functional computer system, those skilled in the art will appreciate that modules of the present invention are capable of being distributed in a variety of forms across a plurality of systems. Embodiments consistent with the invention may also include one or more programs or program modules on different computing systems running separately and independently of each other, while in their entirety being capable of performing business transactions in a large enterprise environment or in a "software on demand" environment. These programs or program modules may be contained on signal bearing media that may include: recordable type media such as floppy disks and CD ROMS, and transmission type media such as digital and analog communication links, including wireless communication links.

The foregoing description has been presented for purposes of illustration and description. It is not exhaustive and does not limit embodiments of the invention to the precise forms disclosed. Modifications and variations are possible in light of the above teachings or may be acquired from the practicing embodiments consistent with the invention. For example, some of the described embodiments may include software and hardware, but some systems and methods consistent with the present invention may be implemented in software or hardware alone. Additionally, although aspects of the present invention are described as being stored in memory, one skilled in the art will appreciate that these aspects can also be stored on other types of computer-readable media, such as secondary storage devices, for example, hard disks, floppy disks, or CD-ROM; the Internet or other propagation medium; or other forms of RAM or ROM.

I claim:

1. An enterprise resource planning system comprising:
a processor, and an application,
the application comprising:
a plurality of business objects,
a backend abstraction layer which comprises:
a plurality of pre-coded interfaces for each business object, each interface including a rule identifying a condition on which the interface is to be used; and
a plurality of pre-coded methods for each interface representing a complete set of read and write functions performed by the enterprise resource planning system on data stored at an external system to the enterprise resource planning system and used by a respective business object;
a plurality of exit points associated with the pre-coded interfaces and the pre-coded methods;
a connectivity layer which comprises:
a plurality of customizable interfaces, each linked to a respective one of the pre-coded interfaces in the backend abstraction layer;
a plurality of customizable operation fields in each of the customizable interfaces, each customizable operation field linked to a respective pre-coded method in a respective pre-coded interface, each customizable operation field storing third-party instructions recognized by the external system for performing the pre-coded read or write function specified by the respective linked pre-coded method at the external system;
wherein the processor is operative to:
execute the source code of the application;
upon reaching one of the exit points,
identify whether a condition in at least one pre-coded interface associated with the identified business object is met;
when the condition is met, identify a pre-coded method in the identified interface associated with a selected function to be executed on the external system; and
identify for transmission and execution at the external system the third-party instructions stored in a respective customizable operation field linked to the identified pre-coded method.

2. The enterprise resource planning system of claim 1, where the application contains an exit point for every interaction in the application with the external system.

3. The enterprise resource planning system of claim 1, where the only means for interacting with an external system in the application is through the backend abstraction layer.

4. The enterprise resource planning system of claim 1, where the customizable interfaces and operation fields in the connectivity layer are customizable by a user without modifying any source code.

5. The enterprise resource planning system of claim 1, where the interfaces and methods in the backend abstraction layer are pre-coded by a manufacturer of the application.

6. The enterprise resource planning system of claim 5, where the interfaces and methods in the backend abstraction layer are not customizable by a user.

7. The enterprise resource planning system of claim 1, where the function in each pre-coded method specifies a function to be performed on a specific data record in the external system.

8. The enterprise resource planning system of claim 7, where the function is a data retrieval query.

9. An article of manufacture comprising a non-transitory processor-readable media containing instructions that, when executed by a processor, cause the processor to:
execute a source code of an application, the application comprising:
a plurality of exit points, each exit point associated with a pre-coded interface or a pre-coded method;
a backend abstraction layer including:
a plurality of pre-coded interfaces for each business object, each interface including a rule identifying a condition on which the interface is to be used; and
a plurality of pre-coded methods for each interface representing a complete set of read and write functions performed by the enterprise resource planning system, each method identifying a function to be executed on data stored at an external system to the enterprise resource planning system and used by a respective business object; and
a connectivity layer including:
a plurality of customizable interfaces, each linked to a respective one of the pre-coded interfaces in the backend abstraction layer;
a plurality of customizable operation fields in each of the customizable interfaces, each customizable operation field linked to a respective pre-coded method in a respective pre-coded interface, each customizable operation field configured to store third-party instructions recognized by the external system for performing the pre-coded read or write function specified by the respective linked pre-coded method at the external system; and
upon reaching one of the exit points, identifying whether a condition in at least one pre-coded interface associated with the identified business object is met;
when the condition is met, identifying a pre-coded method in the identified interface associated with a selected function to be executed on the external system;
identifying the third-party instructions stored in a respective customizable operation field linked to the identified pre-coded method; and
transmitting the identified third-party instructions to the external system.

10. The article of manufacture of claim 9, where the application contains an exit point for every interaction in the application with the external system.

11. A computer-implemented method comprising, at a processor:
executing a source code of an application, the application comprising:
a plurality of exit points, each exit point associated with a pre-coded interface or a pre-coded method;
a backend abstraction layer including:
a plurality of pre-coded interfaces for each business object, each interface including a rule identifying a condition on which the interface is to be used; and
a plurality of pre-coded methods for each interface representing a complete set of read and write functions performed by the enterprise resource planning system, each method identifying a function to be executed on data stored at an external system to the enterprise resource planning system and used by a respective business object; and
a connectivity layer including:
a plurality of customizable interfaces, each linked to a respective one of the pre-coded interfaces in the backend abstraction layer;
a plurality of customizable operation fields in each of the customizable interfaces, each customizable operation field linked to a respective pre-coded method in a respective pre-coded interface, each customizable operation field configured to store third-party instructions recognized by the external system for performing the pre-coded read or write function specified by the respective linked pre-coded method at the external system;
upon reaching one of the exit points, including whether a condition in at least one pre-coded interface associated with the identified business object is met;
when the condition is met, identifying a pre-coded method in the identified interface associated with a selected function to be executed on the external system;
identifying the third-party instructions stored in a respective customizable operation field linked to the identified pre-coded method; and
transmitting the identified third-party instructions to the external system over a communications network.

12. The method of claim 11, where the application contains an exit point for every interaction in the application with the external system.

* * * * *